United States Patent [19]
Hindin

[11] 3,711,148
[45] Jan. 16, 1973

[54] LINER ARRANGEMENT FOR REFRIGERATED TRAILERS

[75] Inventor: Eugene Hindin, Philadelphia, Pa.

[73] Assignee: Gindy Manufacturing Corporation, Downingtown, Pa.

[22] Filed: April 30, 1971

[21] Appl. No.: 139,092

[52] U.S. Cl.................296/28 M, 105/423, 296/31 P
[51] Int. Cl. .................................................B60p 3/20
[58] Field of Search.....296/28 M, 29, 31 P; 105/409, 105/410, 423; 52/309, 543; 62/239; 98/6

[56] References Cited

UNITED STATES PATENTS

| | | | |
|---|---|---|---|
| 3,308,738 | 3/1967 | Heimann | 98/6 |
| 2,069,986 | 2/1937 | Williamson | 105/409 |
| 2,923,256 | 2/1960 | Johansson | 105/423 |
| 3,175,520 | 3/1965 | Talmey | 105/409 X |
| 2,823,624 | 2/1958 | Swann | 105/423 |
| 2,791,463 | 5/1957 | Levitt | 296/31 P X |
| 3,618,274 | 11/1971 | Vickerman | 105/423 |

Primary Examiner—Kenneth H. Betts
Assistant Examiner—Leslie J. Paperner
Attorney—Thomas I. Davenport, Edward M. Farrell, John D. Sowell, Alford L. Trueax, Jr. and William R. Nolte

[57] ABSTRACT

A liner assembly for the interior of a refrigerated trailer body. The assembly includes aligned corrugated upper and lower panels. The lower panels correspond to areas of heavy abuse due to puncturing of panels by tines of fork lift trucks or pallets and are secured to the side walls to permit ready replacement.

1 Claim, 5 Drawing Figures

PATENTED JAN 16 1973 3,711,148
SHEET 1 OF 2
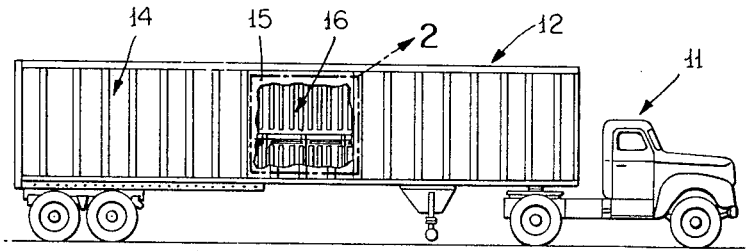
Fig.1
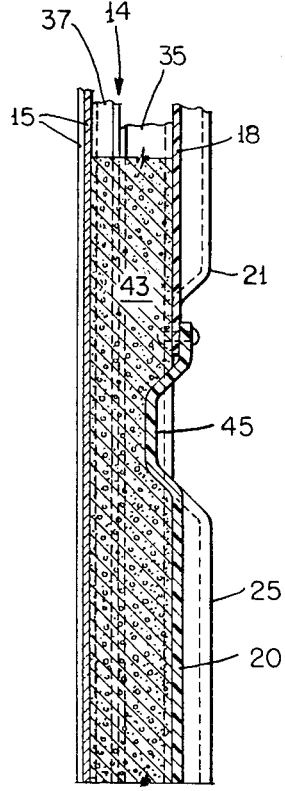
Fig.4
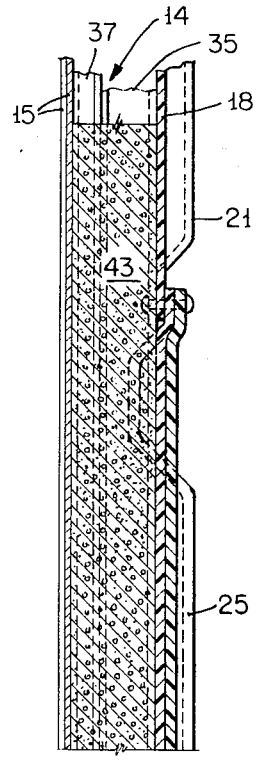
Fig.3
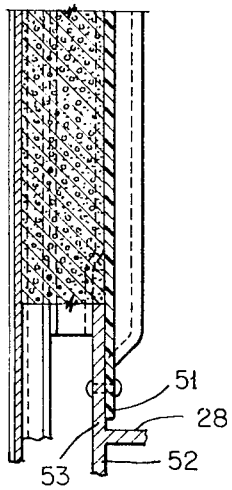
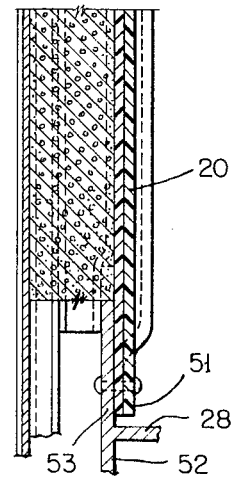
Fig.5
INVENTOR.
EUGENE HINDIN
BY William R. Nolte
AGENT

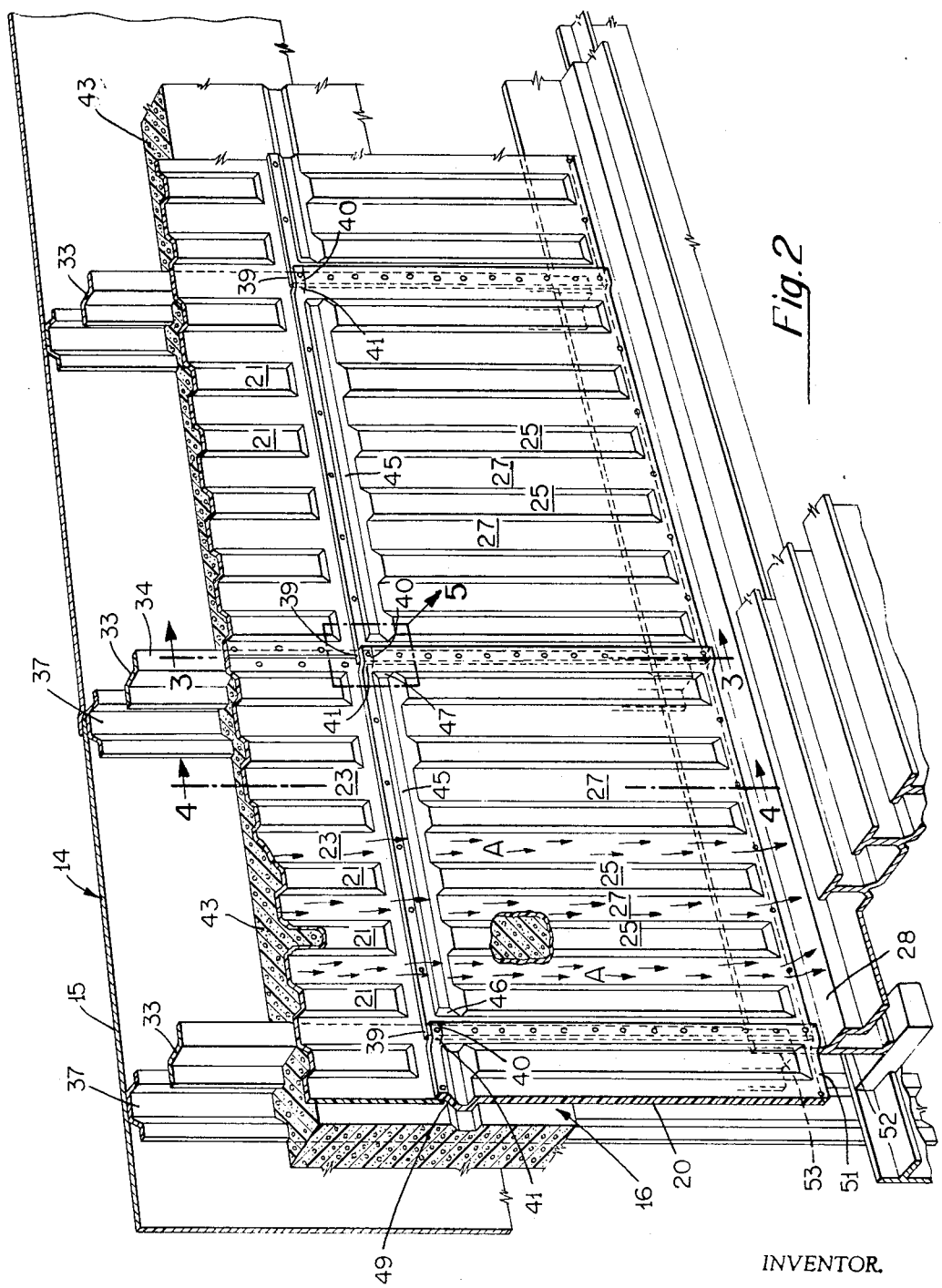

LINER ARRANGEMENT FOR REFRIGERATED TRAILERS

It has been the practice in the design of refrigerated vans and trailers to provide liners which consist of molded laminate composed of polyester resins reinforced with fiberglas either in the form of woven cloth or chopped roving. Typically these panels are molded in a large press between steel molds to provide a corrugated configuration with external flat marginal edges, the latter used for placement of structural fasteners. The liners are generally installed on insulating spacers which are fastened to the vertical structural members of the trailer side panel. The space between the liner and the external skin of the trailer is generally filled with an expanded polyurethane foam material by one of several well known "foam in place" methods. The lining material is fairly expensive and its thickness is held to a minimum to conserve weight and cost. The panels of lining material are generally rectangular in form and are of a height to extend from floor to ceiling. The ribs or corrugations of the linings are vertically disposed to enable air flow between the ceiling and floor of the interior of the trailer, the air being guided in the depressions formed between the inwardly projecting ribs of the liners.

The above described type of installation poses certain disadvantages. In service the panels are frequently damaged in their lower areas by penetration of pallets or the tines of fork lift trucks. Since these trailers are generally used for hauling meat and other food stuffs, torn or damaged lining quickly renders the trailers unsuited for service because of the potential contamination of food with the glass fibers of the lining or because refuse would be trapped in the broken areas of the lining. This necessitates relatively frequent replacement of this quite expensive lining. The lining which usually extends from ceiling to floor must be replaced even though the damaged area usually occurs a close distance from the floor.

While on conventional trailers a situation of this type would be met by installing scuff strips over the vulnerable area to protect it, this solution is not feasible in connection with the corrugated liners because pockets would be created for the entrapment of refuse between the scuff strip and the lining.

Another disadvantage of the above type of installation arises in that the foam-in-place process in conjunction with the thin sheet liners requires the installation and subsequent removal of shoring within the body of the trailer. The shoring is used to prevent bulging of the liners during the foaming operation due to the pressure created by the expanding foam. While the use of shoring can be eliminated by closer spacing of the side panel posts, this is also undesirable because of the increased costs of construction and because of increased thermal leakage adjacent the side panel post-liner interface.

It is an object of this invention, therefore, to provide an improved liner construction for enclosing the interior of a vehicle refrigerated by a cooling fluid which avoids one or more of the disadvantages of the prior art constructions.

It is a further object of this invention to provide an improved liner construction for a vehicle interior refrigerated by a cooling fluid enabling the liner to have greater resistance to abuse in the area which requires it.

It is still a further object of this invention to provide an improved liner construction for a vehicle refrigerated by a cooling fluid which enables easy replacement of the lower liner areas subject to abuse when the same do become damaged.

For a better understanding of the present invention, together with other and further objects thereof, reference is had to the following description taken in connection with the accompanying drawing and its scope will be pointed out in the appended claims.

In the drawing, FIG. 1 is a view of a refrigerated vehicle with a side wall portion thereof broken away and with the interior liners thereof shown in assembled position;

FIG. 2 is an enlarged detail of a portion of the side wall of FIG. 1, shown in elevation, with the upper and lower liners in position;

FIG. 3 is a sectional view taken along the lines 3—3 of FIG. 2 taken adjacent the side post and through the spacer illustrating the manner of attaching adjacent liner panels;

FIG. 4 is a sectional view taken along the lines 4—4 of FIG. 2 showing a section through aligned depressions in the upper and lower liner panels;

FIG. 5 is an enlarged view enclosed in heavy lines of overlapped corner portions of adjacent liners taken in FIG. 2.

The present embodiment of the invention can best be understood by reference to the installation as indicated generally in FIG. 1. There is illustrated a combination refrigerated tractor-trailer vehicle 11, including a trailer 12, the interior of the trailer being suitably refrigerated by a unit not illustrated. The trailer 12 may be constructed in a conventional manner to include side walls 14 having an outer skin 15 surrounding the exterior of the trailer and an interior liner assembly 16 which lines the inside walls of the trailer and is connected to the side walls 15.

The liner assembly 16 includes a plurality of upper corrugated liner panels 18, and a plurality of corrugated lower liner panels 20. The upper liners 18 include a plurality of spaced apart vertically disposed ribs 21 which define a plurality of depressions 23 therebetween. The lower liner 20 includes a plurality of ribs 25 which are like-spaced as the ribs 21 of liner panels 18 above and include depressions 27 between the ribs 25. The ribs 21 of upper liner 18 are generally of the same configuration as the ribs 25 of the lower liner 20 and are vertically aligned with one another. Correspondingly the depressions 23 of upper liner 18 and depressions 27 of the lower liner 20 are aligned vertically thereby enabling unbroken flow of a cooling fluid such as air from the ceiling of the vehicle to the floor below as indicated by the arrows as at A.

As best seen in FIGS. 1 and 2 the upper panels 18 are generally rectangular in configuration and extend vertically from the ceiling area of the interior of the trailer to a distance spaced from the floor 28 of the trailer. The opposite side edges 30, 31 of successive longitudinally disposed upper panels 18 abut one another. The upper panels 18 are of a length to extend between and overlap the Zee spacer members 33 at their inner flanges 34. The outer flange 35 of the spacer member is suitably secured to the upright posts 37 constituting framing for the side walls 14.

The lower liner panels 20 are staggered longitudinally interiorly along the length of the trailer relative to the upper liner panels 18. The lower liner panels 20 each include a first side marginal edge 39 and an opposed side marginal edge 40 having a jogged portion as at 41.

Still referring to FIG. 2 it is noted that the spaces between the outer skin 15 of the side wall 14 and the inner faces of the interior liner assembly 16 are filled with an insulating layer 43 which may be of an expanded polyurethane material which may be installed by a suitable "foam in place" method. The material so used normally expands upon hardening and has a tendency to cause inward bulging of the liner sheets toward the interior of the trailer. In order to eliminate the necessity for such bulging, the use of shoring has normally been employed. In accordance with the present invention, the lower liner panels 20 are provided with narrow transverse trough-like depressions 45 having opposed end portions 46, 47 which terminate short of the spacers 33. These trough-like depressions constitute stiffening indentations which help eliminate bulging of the panel assembly adjacent the area of overlap of the lower liner panels 20 with the upper panels 18. The top marginal edge of the lower panel 20 includes a jogged portion 49 which extends inwardly toward the interior of the trailer to provide a seal in the form of a lap joint for securing the lower panels 20 to the upper panels 18. The lower marginal portion 51 of the lower liner panel 20 is secured to an upright flange 53 of longitudinal floor side stringer member 52.

As previously noted, the area of the panel assembly 16 corresponding to that covered by the lower panel 20 corresponds to an area of heavy abuse. The area in question is frequently damaged as a result of penetration by pallets containing stacked cargo thereon or damage due to penetration by the tines of lift forks. In order therefore to provide greater protection in these areas, the lower panel 20 is made of greater thickness than the upper panel 18. Thus the lower panel has greater capacity to resist abuse and in the event of damage, the lower panel only need be replaced.

While there has been described what at present is considered to be the preferred embodiment of the invention, it will be obvious to those skilled in the art that various changes and modifications may be made therein without departing from the invention.

What is claimed is:

1. In a refrigerated trailer body having side walls, said side walls including spaced apart upright posts, an outer skin secured exteriorly to said posts and upper liner panels and lower liner panels secured interiorly to said posts, said lower liner panels being of thicker gauge material than said upper liner panels, said side walls including foam in-place insulation between said outer skin and said upper and said lower panels, each said upper and each said lower liner panels being substantially rectangular, said upper liner panels each having a plurality of spaced apart vertically disposed ribs and depressions, said lower liner panels including a plurality of like-spaced ribs and depressions vertically aligned with those of the upper liner panels, said lower liner panels and having a top marginal edge portion overlapping the lower marginal edge portion of said upper liner panels, each said lower liner panel including a reinforcing trough portion extending parallel and adjacent to said top marginal edge portion between adjacent posts and transverse to said vertically disposed ribs and depressions, said trough portion serving to prevent buckling between said upper and lower panels.

* * * * *